US006470396B2

(12) United States Patent
Tognazzini

(10) Patent No.: US 6,470,396 B2
(45) Date of Patent: Oct. 22, 2002

(54) METHOD FOR CONTINUING EXECUTING A PROGRAM ON A SECOND COMPUTER AFTER ALL INFORMATION RELATED TO THE PROGRAM ARE BEING COPIED FROM A FIRST COMPUTER

(75) Inventor: Bruce Tognazzini, Woodside, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/984,483

(22) Filed: Oct. 30, 2001

(65) Prior Publication Data

US 2002/0026530 A1 Feb. 28, 2002

Related U.S. Application Data

(62) Division of application No. 09/793,595, filed on Feb. 27, 2001, which is a division of application No. 09/266,851, filed on Mar. 12, 1999, which is a division of application No. 08/671,297, filed on Jul. 1, 1996, now Pat. No. 5,906,657.

(51) Int. Cl.⁷ .............................................. G06F 15/16
(52) U.S. Cl. ........................ 709/248; 709/212; 709/218
(58) Field of Search ................................. 709/248, 208, 709/212, 213, 216, 218; 705/35; 707/511, 201; 714/16

(56) References Cited

U.S. PATENT DOCUMENTS

| | | | |
|---|---|---|---|
| 4,988,981 A | | 1/1991 | Zimmerman et al. |
| 5,375,068 A | | 12/1994 | Palmer et al. |
| 5,495,077 A | | 2/1996 | Miller et al. |
| 5,532,939 A | | 7/1996 | Psinakis et al. |
| 5,561,446 A | | 10/1996 | Montlick |
| 5,590,277 A | * | 12/1996 | Fuchs et al. ................... 714/16 |
| 5,666,530 A | | 9/1997 | Clark et al. |
| 5,694,541 A | | 12/1997 | Service et al. |
| 5,703,623 A | | 12/1997 | Hall |
| 5,774,877 A | * | 6/1998 | Patterson et al. .............. 705/35 |
| 5,893,128 A | * | 4/1999 | Nauckhoff ................... 707/511 |
| 5,978,813 A | * | 11/1999 | Foltz et al. ................. 707/201 |

* cited by examiner

Primary Examiner—Le Hien Luu
(74) Attorney, Agent, or Firm—McDermott, Will & Emery

(57) ABSTRACT

A handheld computing device is used to copy files from the screen of a fixed computer. The display of the handheld device is linked to that of the underlying computer and file and directory icons together with their underlying files are copied to the handheld device. Files from the handheld device can also be transferred to the fixed computer. When a user is running a program on the fixed computer, he may capture the state of that computer and transfer everything needed to permit execution of that program to continue uninterrupted on the handheld device. Thus files and executing programs may be lifted from the fixed computer and used on the handheld device.

2 Claims, 15 Drawing Sheets

METHOD FOR CONTINUING EXECUTING A PROGRAM ON A SECOND COMPUTER AFTER ALL INFORMATION RELATED TO THE PROGRAM ARE BEING COPIED FROM A FIRST COMPUTER

This application is a Divisional of application Ser. No. 09/793,595 filed Feb. 27, 2001 which is a Divisional of application Ser. No. 09/266,851 filed Mar. 12. 1999 which is a Divisional of application Ser. No. 08/671,297 filed Jul. 1, 1996 now U.S. Pat. No. 5,906,657.

BACKGROUND OF THE INVENTION

1. Field of the Invention

The invention relates to computer systems, and more particularly, to the transfer of files between computer systems not physically networked together.

2. Description of Related Art

When transferring files between computer systems, it is common to utilize an intermediary diskette. A diskette is loaded into a disk drive of one computer system, the file to be transferred is copied to that diskette, and then the diskette is transported physically to the computer system to which the transfer is to occur and placed in a disk drive of that system. The file is then copied from the diskette to the target computer system.

Computers which are networked together, may transfer files either directly, such as when using a file transfer protocol (FTP), or indirectly via the intermediary of a server. In some systems, all files are stored on a central server and all terminals have access to them, subject to the appropriate security clearance.

The Problems

The transfer of files using a diskette is slow and cumbersome. Transfers must occur twice, first from the source computer to the diskette and then from the diskette to the target computer. Diskettes are limited as to their capacity and often, a file must be broken up and stored on separate diskettes in order to be effectively transferred. The user interfaces utilized to activate a copy command are often not convenient making the transfer difficult. Selecting files, folders and containers from crowded iconic desk tops also creates difficulties. In the network environment, users are often less familiar with the invocation of network commands utilized to transfer files then they are with the operation of their own computer.

SUMMARY OF THE INVENTION

The present invention provides apparatus, systems, processes and computer program products which provide new techniques for transferring files between computers. In typical operation, the user will have a large, fixed computer and a relatively small, handheld flat screen computer, reader or other dedicated flat screen computing device. In typical operation, a user will have an active screen open on the large computer's display. By placing the small flat screen device over the image of a file, the screens of the two computing devices are linked so that the small computer's display "bleeds through" and displays the portion of the large device display being covered on the small device display. This is constantly updated so that by moving the small handheld device over the surface of the large computer's display, different portions of the screen can be displayed on the small computer's display.

In addition to linking of screens, files can be transferred from the fixed device to the handheld device by selecting a transfer mode and by placing an indicator, such as crosshairs on an icon of a file from the fixed device. A copy command then causes the file from the fixed device to be transferred to the handheld device using a communications link, such as an infrared or radio link. The position of the handheld device relative to the fixed computing device is determined using an ultrasound, an infrared or a Polhemus-type six degrees of freedom locator.

In another mode, the state of an operating program together with all needed files can be transferred to the handheld device over the communications link and execution of the program can continue uninterrupted on the handheld device. Alternatively, the handheld device can be slaved to the fixed device and operated remotely.

The file transfer mechanisms of the invention are particularly useful because they implement an analogy to picking up a physical file and moving it to a different computer and putting it down. That is a natural kind of action that is comfortable to most users. It overcomes the problems of the prior art in ways that are convenient to a user.

The invention relates to computer apparatus for linking with a portable computer for the transfer of information, including a bus, a central processing unit connect to and controlling the bus, a wireless transceiver for sending information to and receiving information from the portable computer, and a position detector, connected to the bus, for determining the location and orientation of the portable computer with respect to the computer apparatus. The position detector may be a photocell or a Polhemus receiver. The wireless transceiver is an infrared transceiver. A video buffer provides information to a display. The video buffer provides display information to the wireless transceiver based on the location and orientation of the portable computer.

The invention relates to a portable computer for linking with a non-portable computer for the transfer of information, including a wireless transceiver for receiving information from the non-portable computer, and two video buffers, one of which provides information from the portable computer to a display, and the other of which provides information from the non-portable computer over the wireless transceiver two the display.

The invention also relates to a method of linking the display screens of a first and a second computer, to display the same information, by determining the position of the second computer relative to the first computer, and transferring display information from the first computer to the second computer for display on the display screen of the second computer when the position of the display information on the display screen of the first computer lies directly underneath a location on the display screen of the second computer.

The invention is also directed to a method of copying one or more files from a first computer to a second computer, by linking the screens of the first computer and the second computer over a wireless transceiver to display the same information, selecting the one or more files for copying, and transmitting the one or more files from the first computer to the second computer over the wireless transceiver.

The invention is also directed to a method of capturing a program running on a first computer to permit it to run on a second computer, by copying all open files from the first computer to the second computer, copying memory space from the first computer to the second computer, linking the screens of the first computer to the second computer, copying registers and program counters from the first computer to the second computer, and beginning executing the program on the second computer.

The invention is also directed to a method of slaving a first computer to a second computer, by redirecting keyboard input so that it is received from the second computer over a wireless communications link, redirecting mouse input so that it is received from the second computer over the wireless communications link, and redirecting display output from the second computer over the wireless communications link.

The invention is also directed to a method of copying one or more files from a portable computer to a fixed computer, by placing the fixed computer into a receive mode, sending a name of a file or directory to be used in storing the one or more files over a wireless link from the portable computer to the fixed computer, opening a file using the name in write mode, copying the contents of the one or more files from the portable computer to the fixed computer, and closing the file or directory.

The invention is also directed to a method of selecting files by linking the screens of the first computer and the second computer over a wireless transceiver to display the same information, and sending commands from the second computer to the first computer over a wireless link to emulate mouse commands originating at the first computer.

The invention is also directed to a method of freezing an image on a display screen of a computer, by linking the screens of a first computer and the second computer over a wireless transceiver to display the same information, determining the position of the second computer relative to the first computer, and transferring display information from the first computer to the second computer for display on the display screen of the second computer (1) when the position of the display information on the display screen of the first computer lies directly underneath a location on the display screen of the second computer and the distance separating the display screen of the first computer and the display screen of the second computer is less than a fixed amount, and (2) otherwise, freezing the information on the display screen of the second computer.

The invention is also directed to a system for linking with a portable computer for the transfer of information, including a network, and a plurality of fixed computers connected to the network, at least one of which has a wireless transceiver for sending information to and receiving information from a nearby portable computer.

The invention is also directed to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
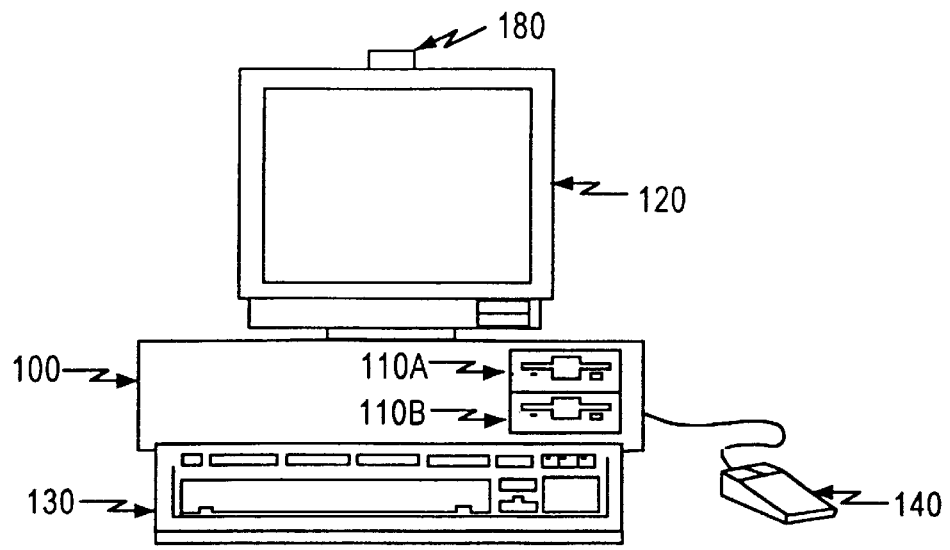
FIG. 1A illustrates a fixed computer of a type suitable for carrying out the invention.

FIG. 1A illustrates a fixed computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc. A three dimensional position detector for receiving position information from another device is shown at 180.

Figure 1B:
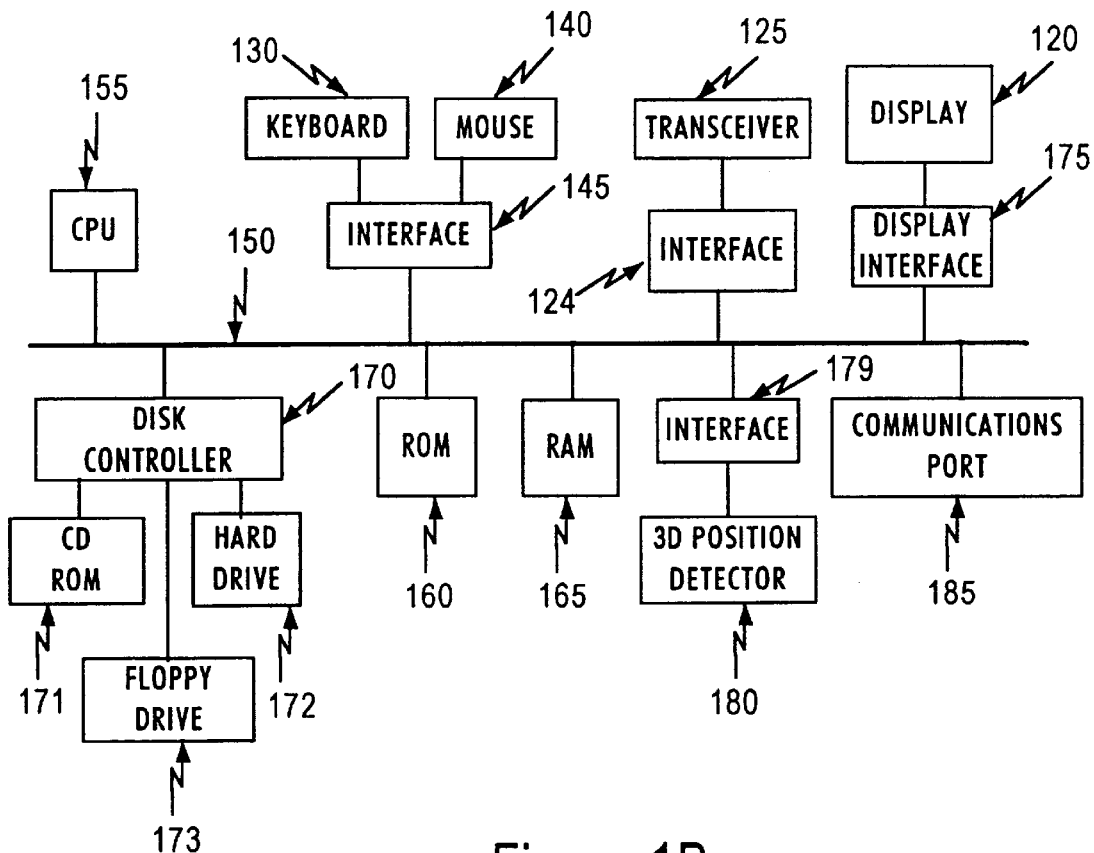
FIG. 1B is a block diagram of the computer of FIG. 1A.

FIG. 1B illustrates a block diagram of the internal hardware of the computer of FIG. 1A. A bus 150 serves as the main information highway interconnecting the other components of the computer.

CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. An I/B interface 145 connects keyboard 130 and mouse 140 to the bus. A display interface 175 interfaces a display 120 and permits information from the bus to be viewed on the display. Communications with external devices can occur over communications port 185. Transceiver 125, connected to the bus over interface 124 is used to communicate with another computing device. Preferably, this is an infrared (IR) transceiver. Three dimensional position detector 180 is connected to the bus over interface 179. Position or location detector 180 may be an ultrasound, infrared (IR) or Polhemus-type six degree of freedom locator. Polhemus devices are manufactured by Polhemus, Incorporated of Colchester, Vermont.

Figure 1C:
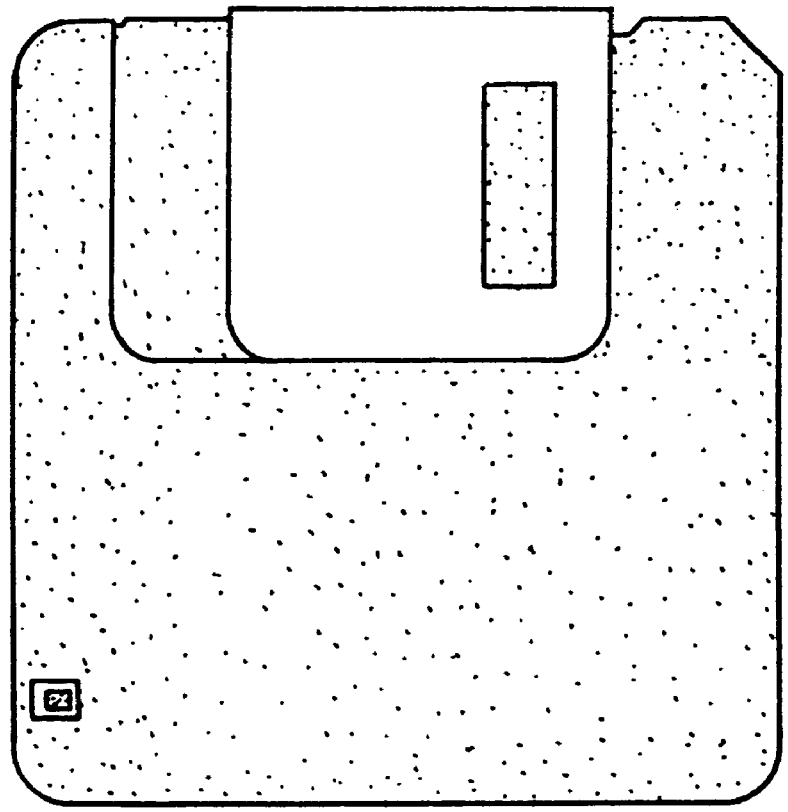
FIG. 1C illustrates an exemplary memory medium containing one or more programs useable with the computer of FIG. 1A.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program and data information for controlling the computer to enable the computer to perform its functions in accordance with the invention.

Figure 2:
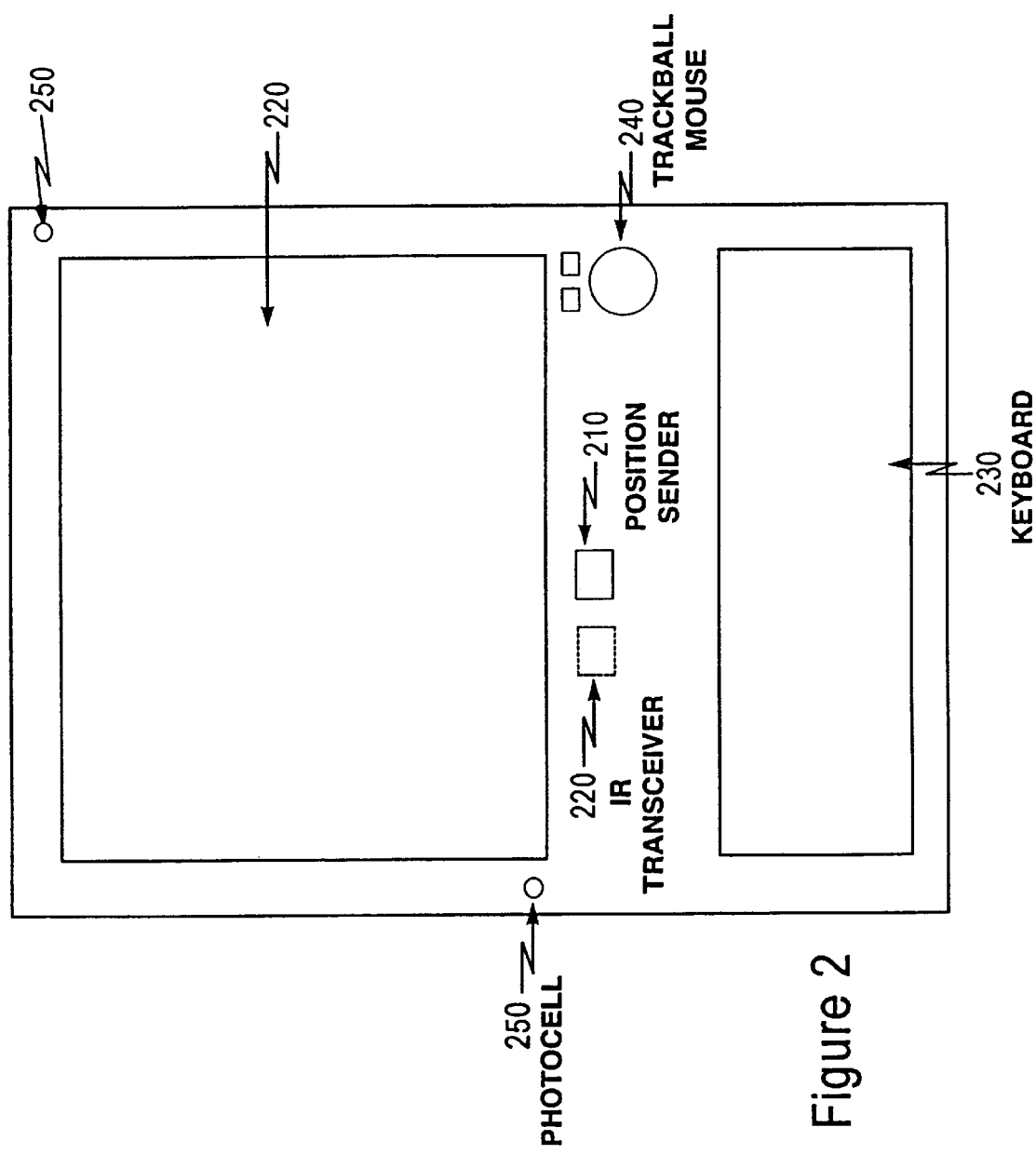
FIG. 2 illustrates a portable computer suitable for use with the fixed computer of FIG. 1 in carrying out the invention.

FIG. 2 illustrates a portable computer suitable for use with the fixed computer of FIG. 1 for carrying out the invention. The handheld computing device shown in FIG. 2 includes a display screen 220, a keyboard or series of keys 230 and a track wall mouse 240 all to assist in carrying out the usual functionality of a computer. In addition, the handheld device includes a position sender 210 for sending the location and orientation of the device vis a vis a receiver located on a fixed computer to be used for, inter alia, linking the displays to the two devices so that the information shown on the display of the device of FIG. 2 parallels the information shown on the portion of the display of the device of FIG. 1A which lies directly beneath it. In addition, the handheld device of FIG. 2 includes an exemplary infrared transceiver 220 for communicating information between the computer shown in FIG. 2 and that shown in FIG. 1A.

The block diagram as shown in FIG. 1B also depicts the internal construction of the handheld device shown in FIG. 2.

Figure 3:
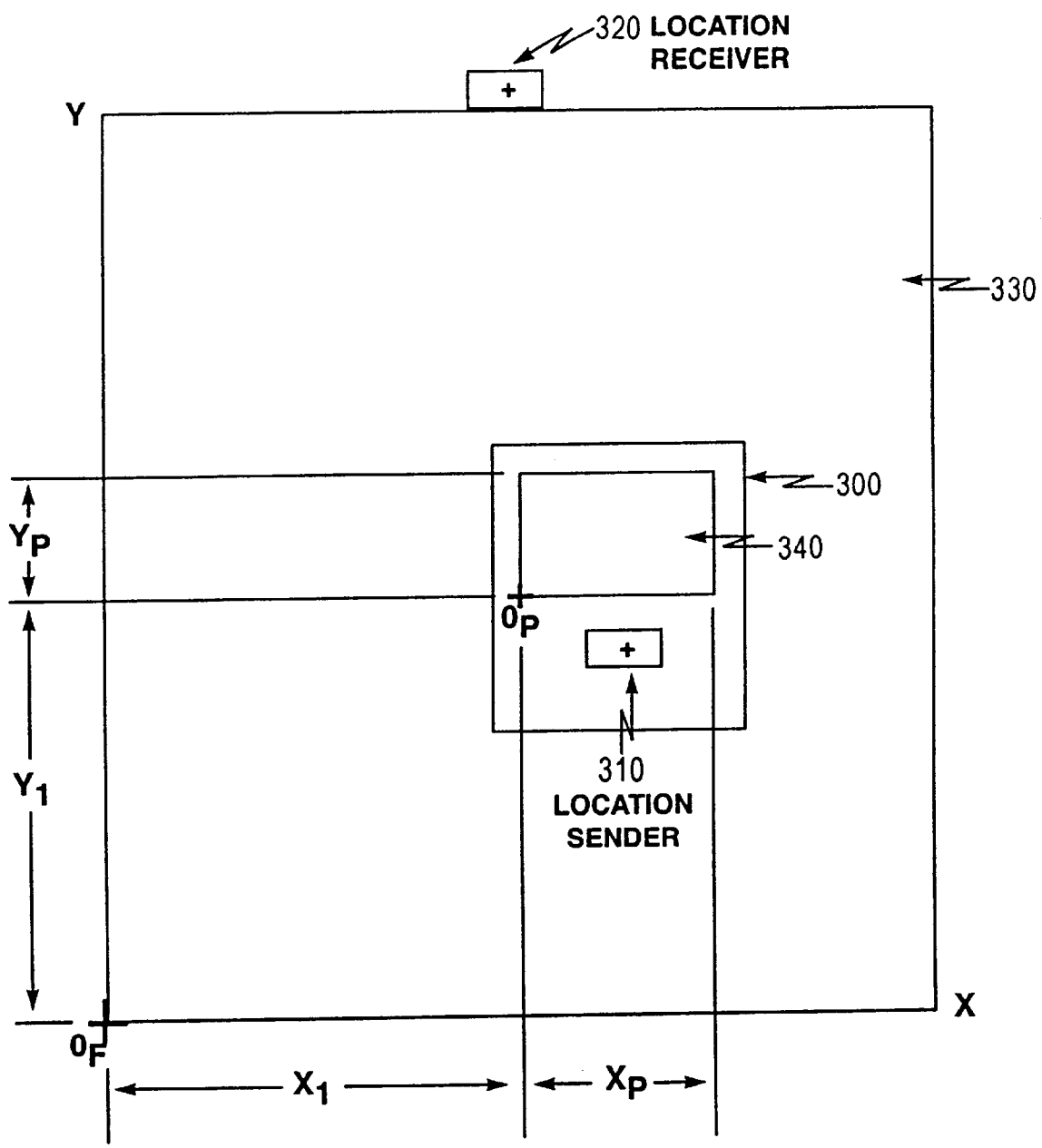
FIG. 3 is an illustration of how the portable computing device of FIG. 2 is positioned with respect to the fixed computing device of FIG. 3 for file transfer.

FIG. 3 is an illustration of how the portable computing device of FIG. 2 is positioned with respect to the fixed computing device of FIG. 3 for file transfer. As shown in FIG. 3, handheld computing device 300 is placed on the display screen 330 of a fixed computing device. Location sender 310 on the handheld device sends location information to location receiver 320 on the fixed device. Display screen 330 on the fixed device and display screen 340 on the portable handheld device are defined with a coordinate system which has an origin, for purposes of this example, in the lower left hand corner. The location of the origin of the coordinate system for display screen 340 on the portable device, $O_P$, is displaced from the origin of the location sender 310 mounted on the same device by a fixed amount. Thus, although location sender 310 specifies the location of itself with respect to location receiver 320, the location of the origin of the display for the portable device is known because it is a fixed offset from the location of the location sender. Similarly, the location of the origin of the fixed display, $O_p$, is known because it represents a fixed offset with respect to the position of location receiver 320. Thus, the position of the handheld display screen is known with respect to the coordinate system utilized for the large display screen. For example, as shown in FIG. 3, the origin of the handheld display screen, $O_P$, is positioned at coordinates X1, Y1 of the fixed screen. The display-screen of the handheld device, 340, has an X extent equal to $X_P$ and a Y extent equal to $Y_P$. Thus, the addresses from the display space of the large screen 330, which corresponds to the address space for the small screen 340 of the handheld device are known.

For ease of explanation of the operation of the invention, it will be assumed for purposes of the example that the resolution of the two display screens are identical, that the CPU's are identical and that the memory spaces of the two devices are identical. These assumptions are not necessary but it simplifies the explanation of the invention.

Figure 4:
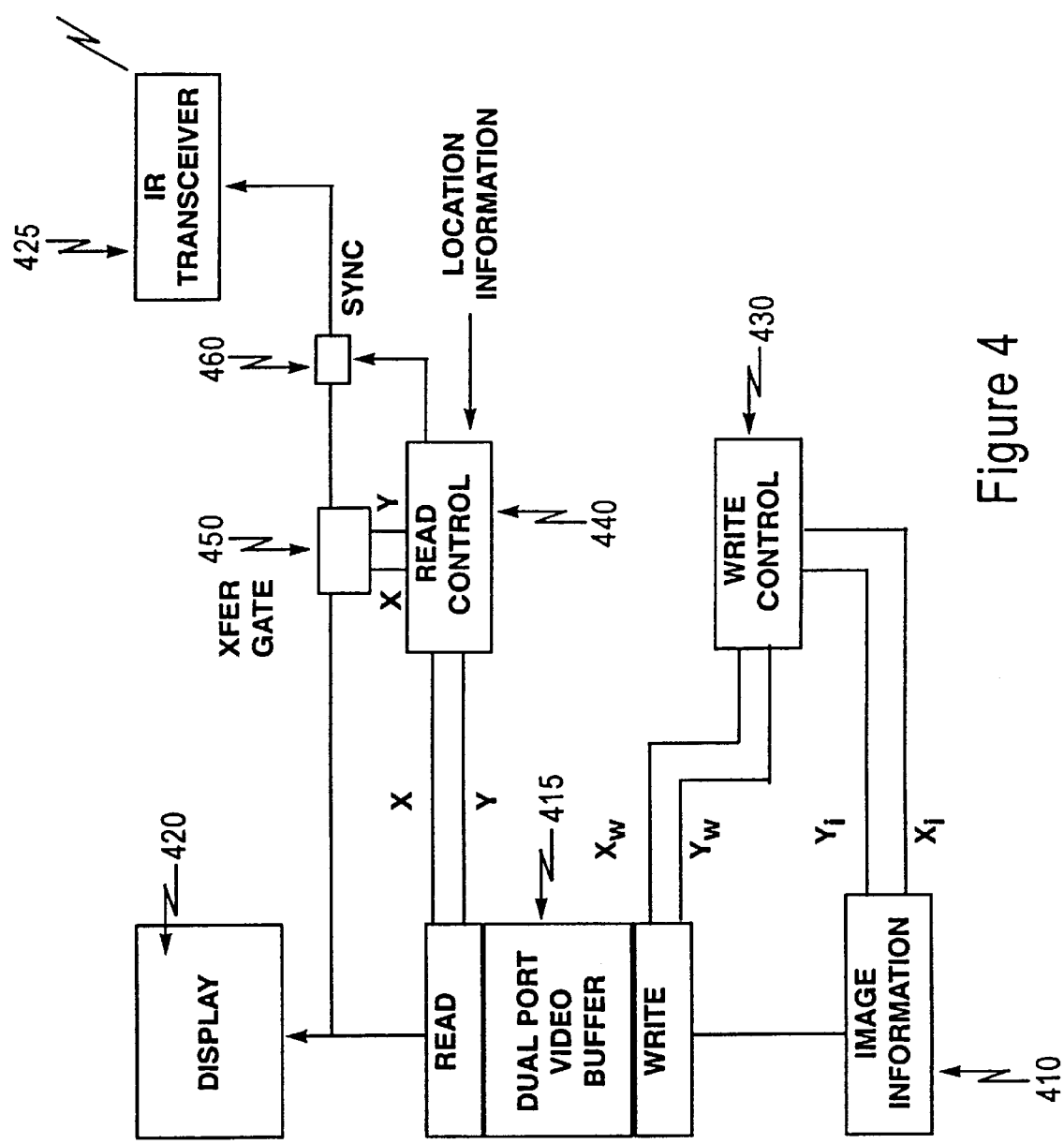
FIG. 4 is a block diagram of circuitry for sending screen information from the fixed device to the portable device for display.

FIG. 4 is a block diagram of circuitry for sending screen information from the fixed device to the portable device for display. As shown in FIG. 4, the normal source of image information 410 for fixed device display 420 is read and written to appropriate locations in a dual port video buffer 415 under control of write control 430. The display 420 is periodically updated with information read from the dual port video buffer 415 under control of read control 440. Thus, the dual port video buffer may be updated concurrently with new image information from source 410 while the display is being updated with the contents of the dual port video buffer via read control 440. Read control 440 has location information for the position of the handheld device display screen vis a vis the main display screen as illustrated in FIG. 3. Therefore, read control 440 knows which portion of the image information shown on display 420 underlies the display screen of the handheld device. Read control 440 opens the transfer gate 450 and allows the portion of the information displayed on display 420 to also be sent over infrared transceiver 425 to the handheld device. In this way, the information underlying the display of the portable device is displayed on the portable device is sent to the portable device and displayed on the portable device. During times when information is not being transferred across transfer gate 450, sync pulses 450 may be sent to ensure that the clocks in read and write controls of the portable handheld device are in synchronization with those of the fixed device.

Figure 5:
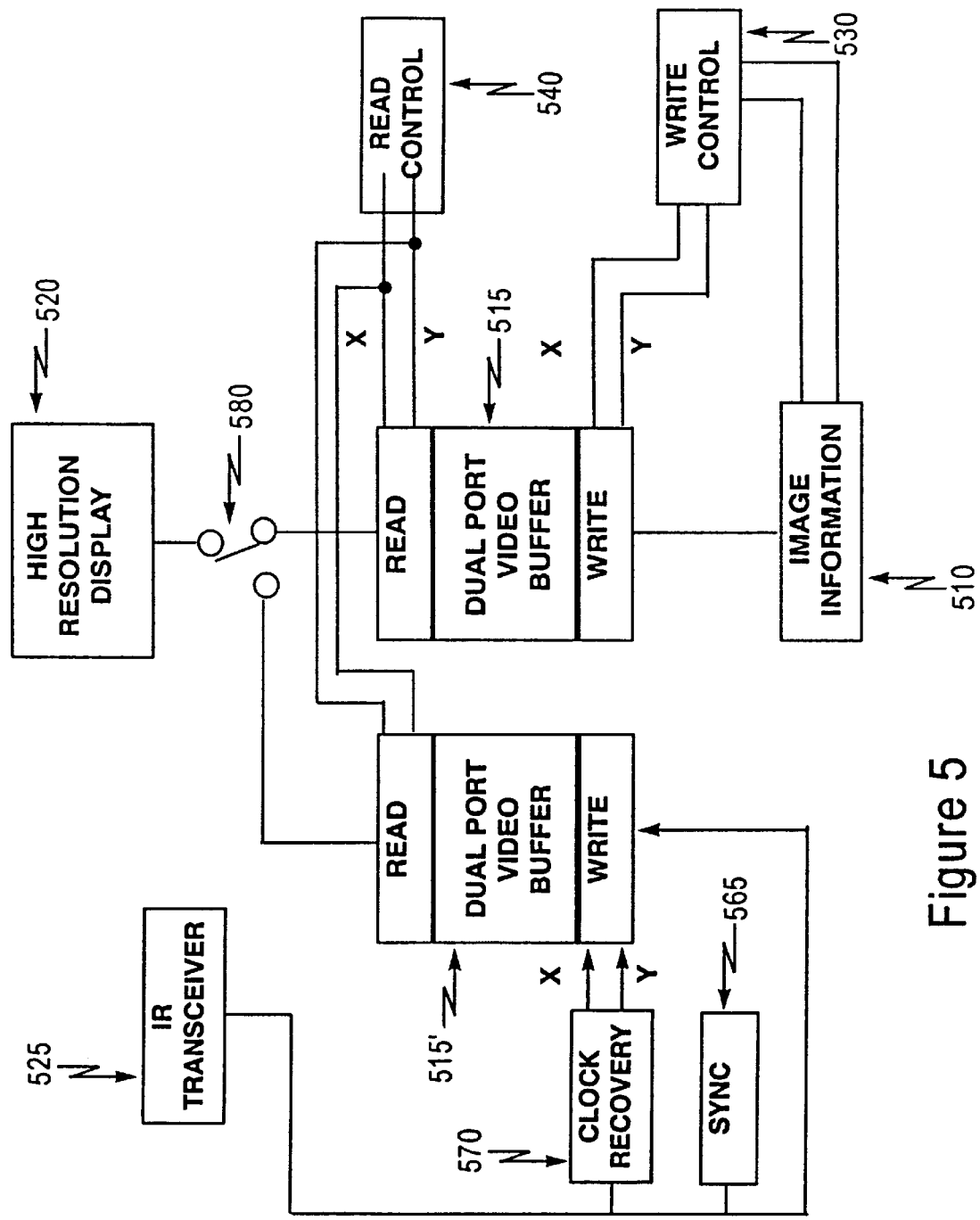
FIG. 5 is a block diagram of circuitry for receiving and displaying screen information sent from the fixed device.

FIG. 5 is a block diagram of circuitry for receiving and displaying screen information sent from the fixed device. Image information source 510 read control 540, write control 530 dual port video buffer 515 and display 520 function when switch 580 is in the position shown to act as a normal display. The operation of that normal display corresponds to that described in conjunction with FIG. 4. However, when the screens of the portable and fixed displays are to be linked so as to display the same information, switch 580 moves to the alternate position. In the alternate position, image information received from the fixed device over IR transceiver 525 is written into dual port portable buffer 515' under control of clock recovery circuit 570 and sync pulses 565. The information for the display 520, in this mode, is then read from the auxiliary dual port video buffer 515' and displayed on display 520. Thus, display 520 can obtain its information internally from image information source 510 or may obtain it externally from the fixed device over IR transceiver 525. In this way, the screens of the two devices may be linked so as to display the same information.

Figure 6:
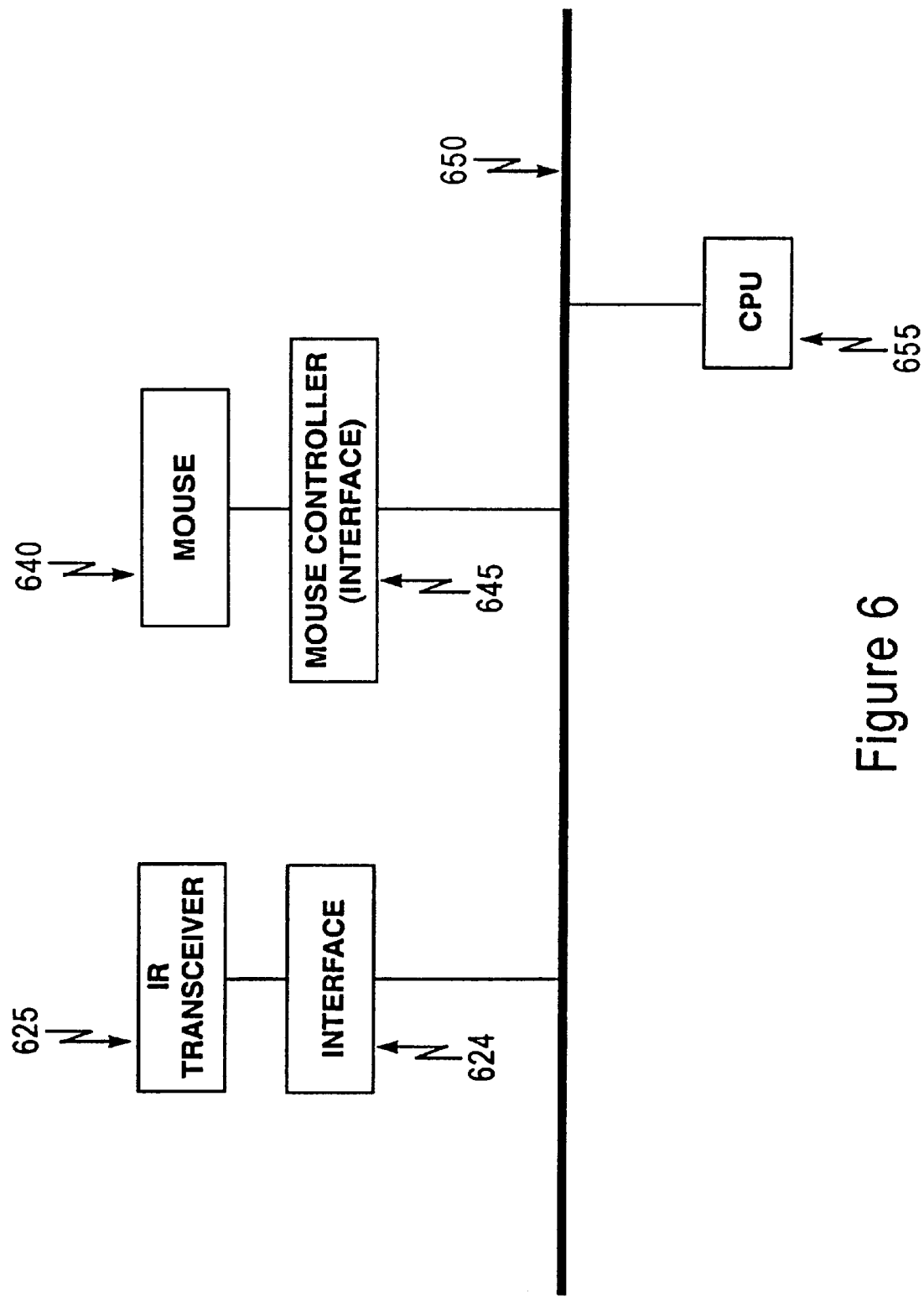
FIG. 6 is a partial block diagram of the bus structure of FIG. 1B utilized to explain transfer of files between a fixed and a portable device.

FIG. 6 is a partial block diagram of the bus structure of FIG. 1B used to explain transfer of files between a fixed and a portable device. As shown in FIG. 6 a mouse 640 is connected to bus 650 via a mouse controller or interface 645. Similarly, a transceiver 625 is connected through its interface 624 to the bus 650. The CPU 655 manages the interaction of these devices on the bus. Each device on the bus is typically handled by a device handler which is a program which typically terminates and stays resident to be invoked as needed. To facilitate the transfer of files, in this exemplary implementation, interactions that a mouse 640 would normally have through its controller with the device handler for the mouse are emulated and sent over IR transceiver 625 to the bus 650. Thus, mouse functions such as those utilized in copying files can be emulated by the portable handheld device and sent to the bus of the fixed device 650 to invoke actions on the part of the CPU 655 as if the commands were generated by mouse 640.

Figure 7:
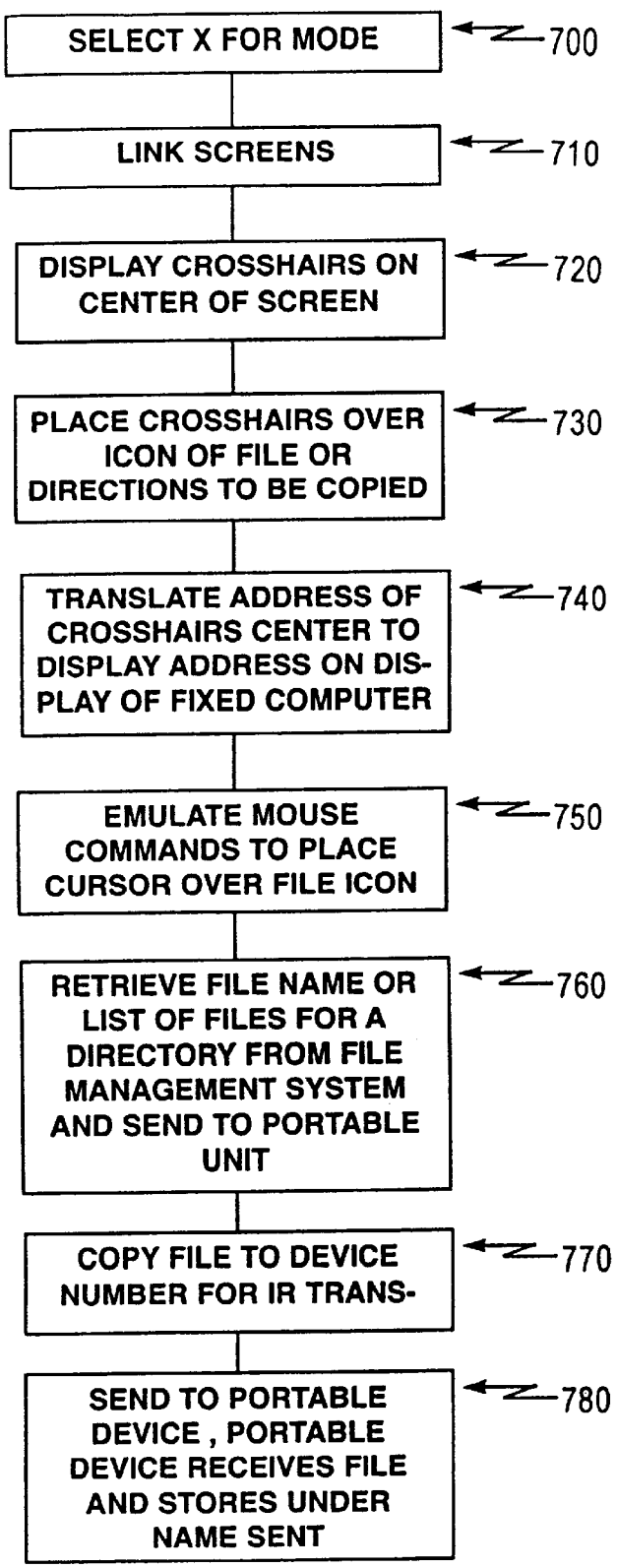
FIG. 7 is a flowchart of a process for transferring files from a fixed device to a portable device.

FIG. 7 is a flowchart of a process for transferring files from a fixed device to a portable device. To initiate file transfer, a transfer mode is selected at the handheld device (700). The screens of the handheld and the fixed device are linked (710) and crosshairs are displayed on the center of the screen of the handheld device (720). The user places the crosshairs over the icon of a file or directory to be copied (730), and since both screens identically are displaying the same information by virtue of the linkage established at 710, the same icons are being viewed. The address of the center of the crosshairs is translated to a display address of a display location on the fixed computer display screen (740) and mouse commands are emulated to place the cursor on the fixed display screen over the file icon selected on the handheld display screen (750). A file name or list of file names for a directory associated with the selected icon are obtained from a file management system on the fixed computer and sent to the portable unit (760). The file or list of files are copied to a device number for the IR transceiver (770) and the files are sent to the portable device where they are received and stored under the name or names sent (780).

Figure 8:
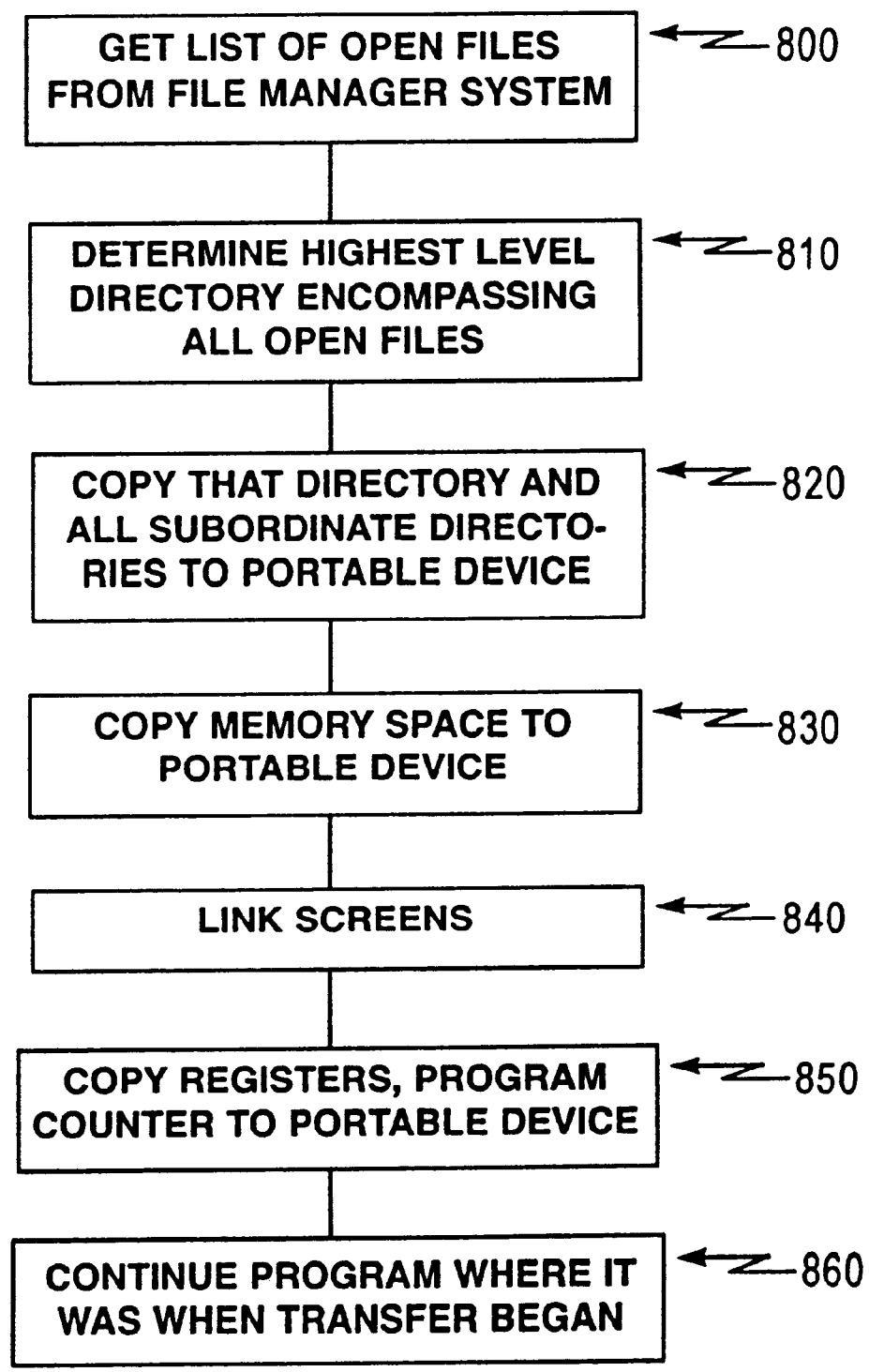
FIG. 8 is a flowchart of a process for "capturing" or transferring a running application from a fixed device to a portable device where execution may continue.

FIG. 8 is a flowchart of a process for "capturing" or transferring a running application from a fixed device to a portable device or execution may continue. Capturing an operating application involves essentially doing everything required to place a portable device into. the same state with respect to the software as if the portable device were the fixed device. In many respects, the process is like returning a computer to a process after a context switch in a multitasking environment, such as that which occurs in UNIX. At a high level, one needs to identify all relevant files necessary to run the application, to make sure that the memory space is set up with all information needed to run the program and to ensure that the CPU registers, program-counters and the like are set up to coincide with the state at which the program left execution. In addition, the screens need to be linked so that both screens display the same information. This all is reflected in the process shown in FIG. 8. At step 800, a list of open files are obtained from the file manager system of the fixed device (800). The highest level directory encompassing all open files (810) is determined and copied together with all subordinate directories to the portable device (820). The memory space is copied into the portable device (830). The operating state of the CPU is reflected in the registers, program counters and other state defining elements are transferred to the portable device (840) to set the CPU into the same state as that of the fixed device and information from one screen is displayed on the other screen (850). This time, the program is ready to resume execution where it left off.

Figure 9:
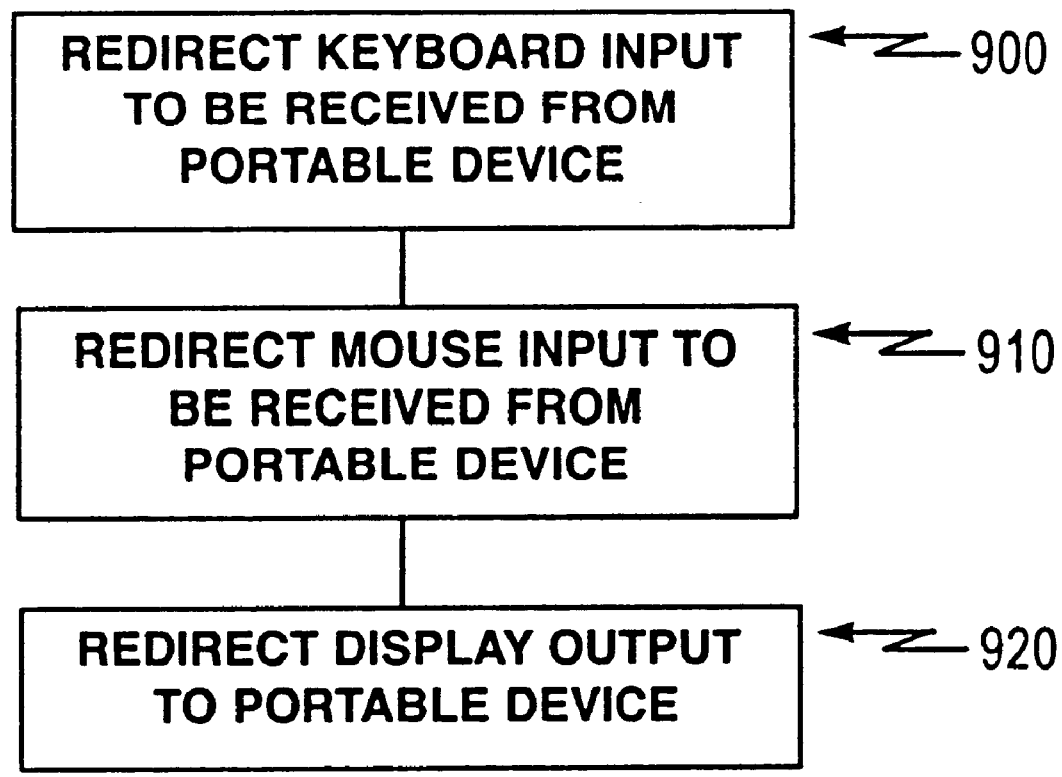
FIG. 9 is a flowchart of a process for running the fixed computer in a mode in which it is slaved to the portable device.

FIG. 9 is a flowchart of a process for running the fixed computer in a mode in which it is slaved to the portable device. Essentially the process is one of redirecting all inputs and outputs to the portable device. As shown at 900, the keyboard input is directed to be received from the portable device over the IR link (900). The mouse input is redirected to be received from the portable device (910) and display output is redirected to the portable device (920). If the displays are of identical resolution, the amount of information displayed on the portable device screen will be less than a full screen of the fixed device, because it is smaller. However, if resolution is higher, a full screen's worth of display may be accommodated. Resolution and resolution conversion is discussed more hereinafter.

Figure 10:
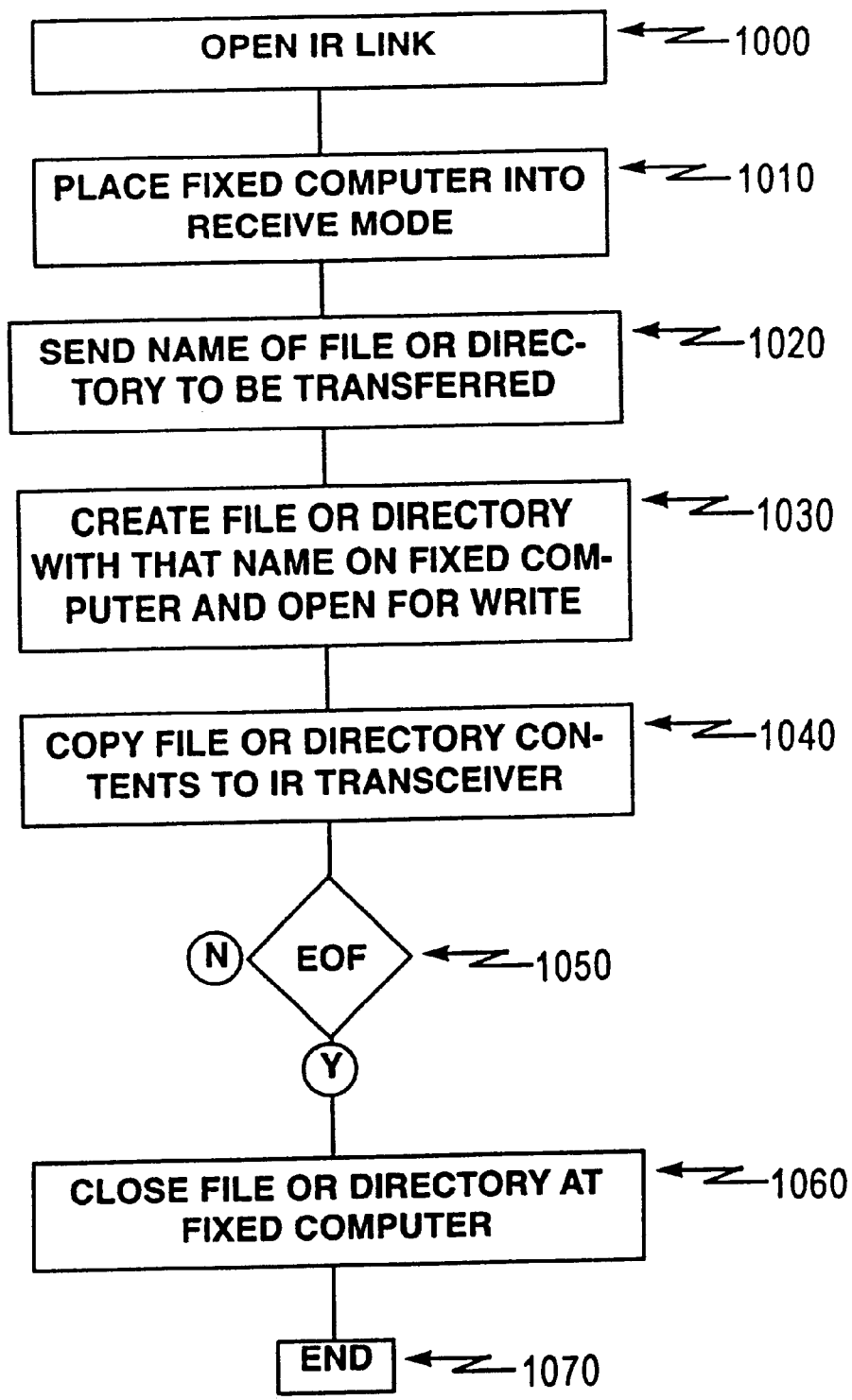
FIG. 10 is a flowchart of a process for sending a file or directory from a portable device to a fixed device.

FIG. 10 is a flowchart of a process for sending a file or directory from a portable device to a fixed device. The IR link between the two computing devices is opened (1000) and the fixed computer is placed into a receive mode (1010). The portable device sends the name of the file or directory to be transferred to the fixed device (1020) where a file or directory with that same name on the fixed computer is created and opened in a write mode (1030). The file or directory is then copied to the IR transceiver link and sent to the fixed computer (1040). Once the end of file has been reached (1050), the file or directory is closed on the fixed computer (1060) and the process ends. If end of file has not been reached, the transfer continues.

Figure 11:
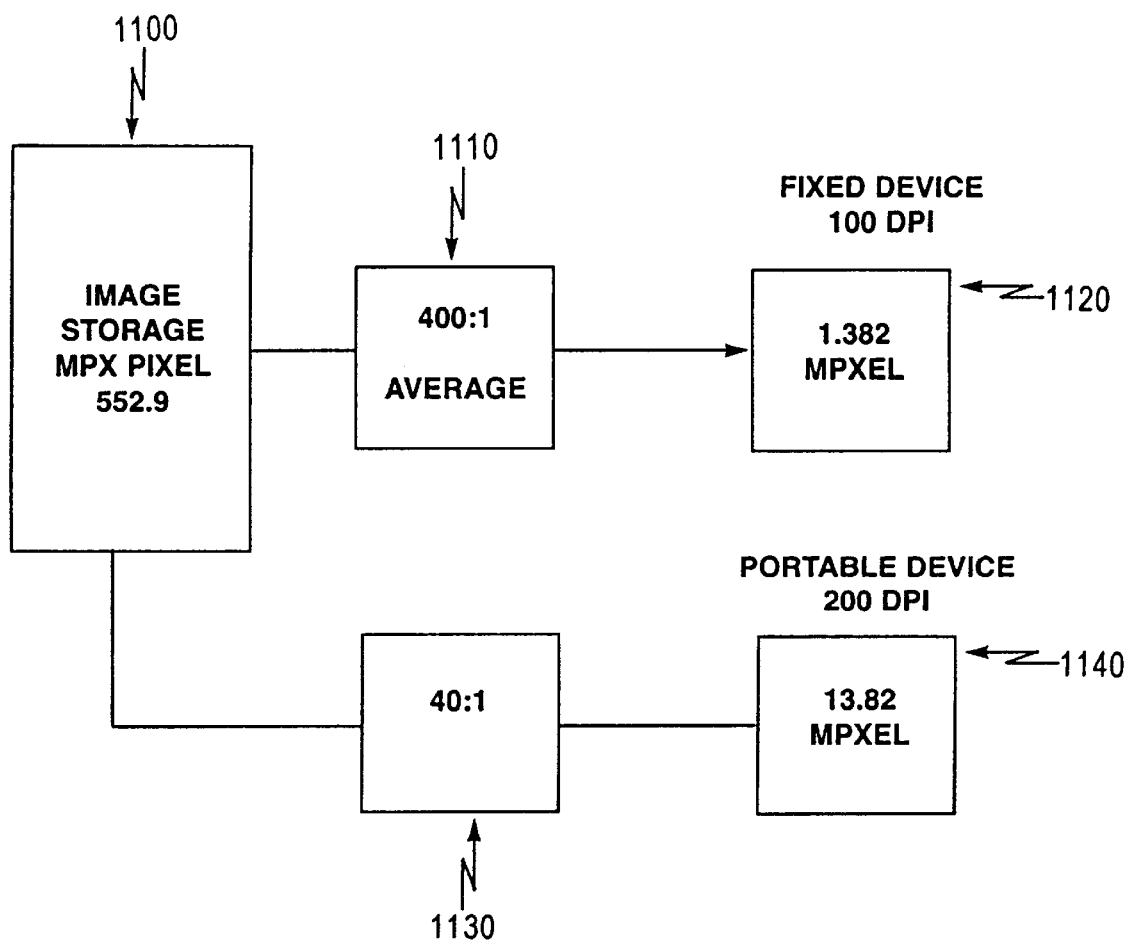
FIG. 11 illustrates a high resolution source of image information converted down to two different resolutions.

FIG. 11 illustrates a high resolution source of image information converted down to two different resolutions. In the example shown in FIG. 11, image storage 1100 contains all information needed to store a 8"×12" image at 400 dpi (dots per inch or pixels per inch). Such image storage would require approximately 15.36 million pixels. By using a 400:1 pixel averaging technique or other resolution conversion techniques, the image represented in image storage 1100 can be displayed at 100 dpi spread over the same area using only 960,000 pixels (1120). The same image stored in image storage 1100 can be converted down at a 40:1 conversion ratio to represent a much higher resolution display for the viewport display. At 200 dpi, the image stored in image storage 1100 can be represented with only 3.84 million pixels (1140). Thus, the high resolution information stored in image storage 1100 can be displayed on a low or resolution device, on fixed device display at 100 dpi and the handheld display can display the same image at 200 DPI, thus covering more of the fixed device screen area on a smaller display.

Figure 12:
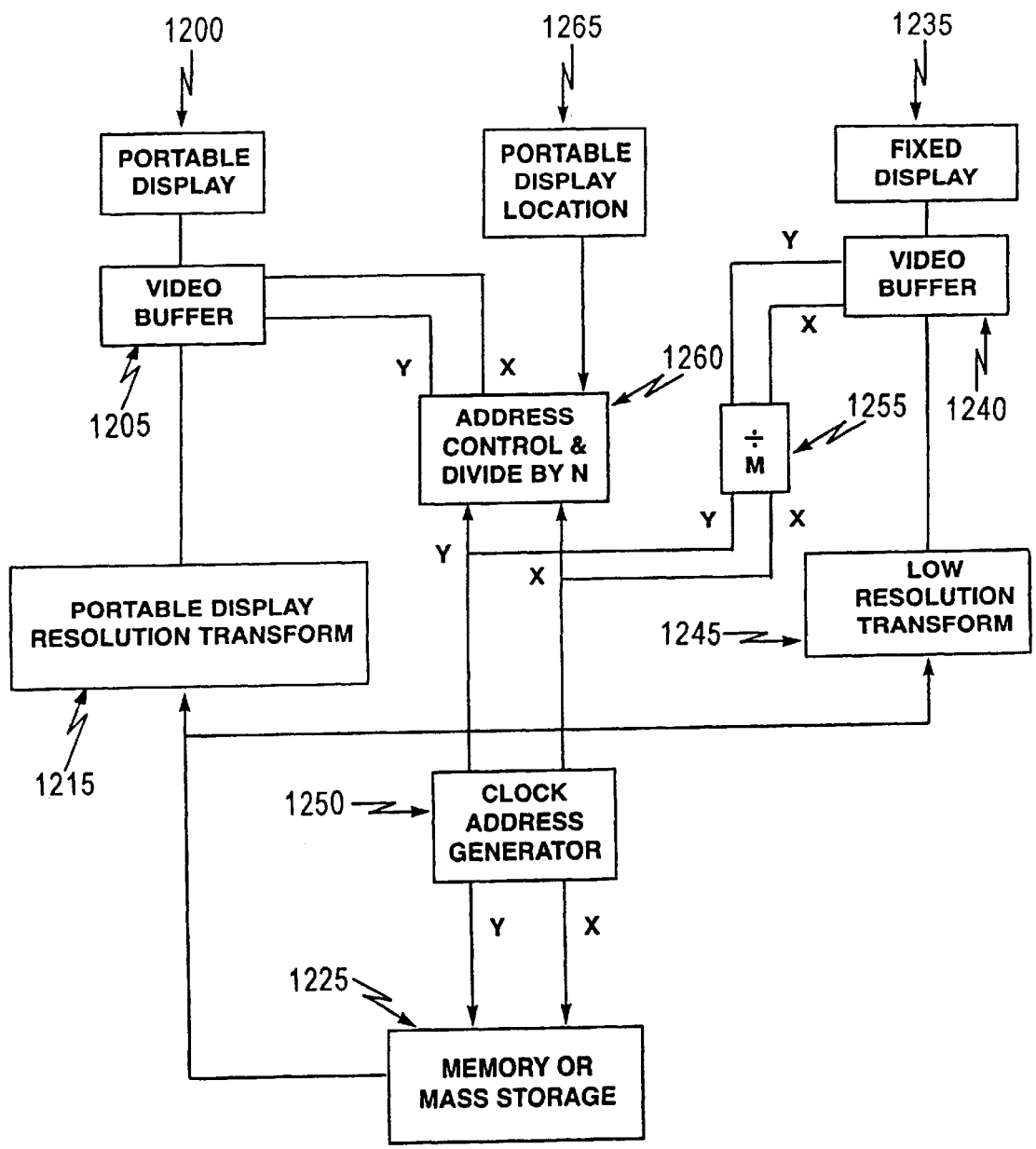
FIG. 12 is a block diagram of fixed and portable display apparatus for controlling addressing.

FIG. 12 is a block diagram of apparatus for selecting sources of image information and for controlling addressing.

The image shown on display 1200 is derived from video buffer 1205 which contains a subset of information stored in image section buffer 1210 as described more hereinafter. Memory or mass storage 1225 contains image information to be displayed. As discussed in conjunction with FIG. 11, this can be a very high resolution image stored. The high resolution image information is converted in display resolution transform 1215 to a resolution appropriate for the display 1200. A selector 1220 is utilized to select sources of information for display on viewport display 1200. Fixed display 1235 is a low resolution device and the image displayed is derived from the high resolution version stored in memory 1225 using low resolution transform 1245. Note that the clock speed is required to deliver all pixels of a high resolution storage such as 1225 and those required to deliver a lower resolution version of the same image differ. Thus, if clock address generator 1250 is driving the readout, for all devices, it must be divided down in order to control the readout of the lower resolution displays. This division down is illustrated in 1255 in FIG. 12. A similar activity occurs in 1260 with respect to the high resolution display, however, only a portion of the overall information available is needed for video buffer 1205. The location of the handheld display can be derived from either a Polhemus device, a photocell detection of a scanning location from the fixed display device.

Figure 13:
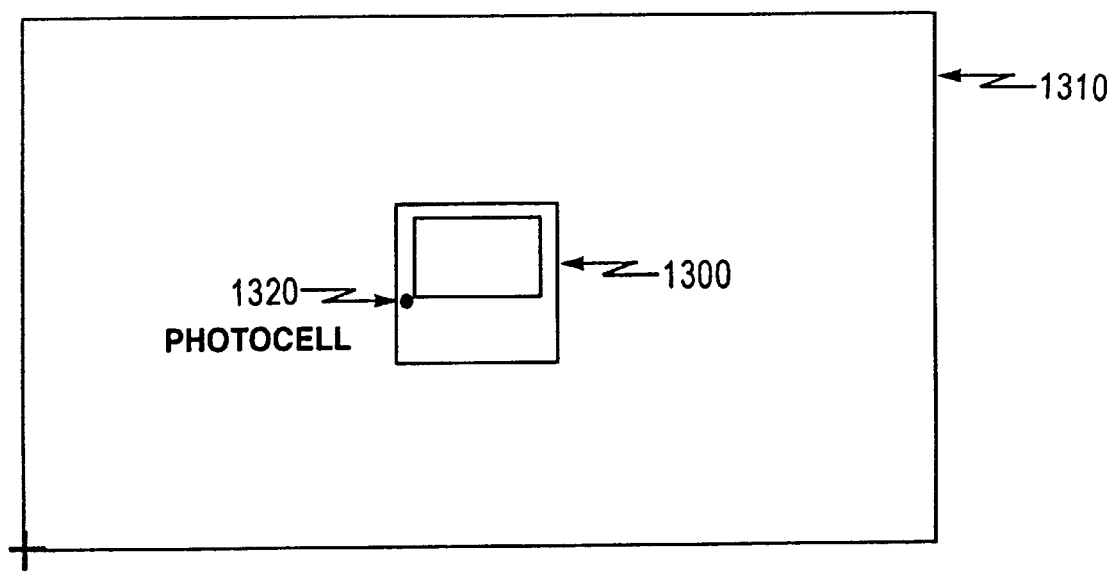
FIG. 13 shows an alternative for locating the portable display location on the fixed display.

FIG. 13 shows an alternative for locating the handheld display when a scanning fixed display device is used. A handheld display 1300 is positioned over a fixed display 1310. A photocell 1320 attached to the bottom of the viewport display 1300 detects when a light beam from the scanning display crosses the photocell. At that instant, the address driving the scanning display is captured to show the position at which the viewport display is located vis a vis the scanning driver. The exact address and location of the information displayed on the underlying fixed display can be determined and utilized to determine the information to be provided on the screen of handheld display 1300. Clearly more than one photocell 1320 can be utilized to determine the orientation of the device vis a vis the backlit screen 1310.

Figure 14:
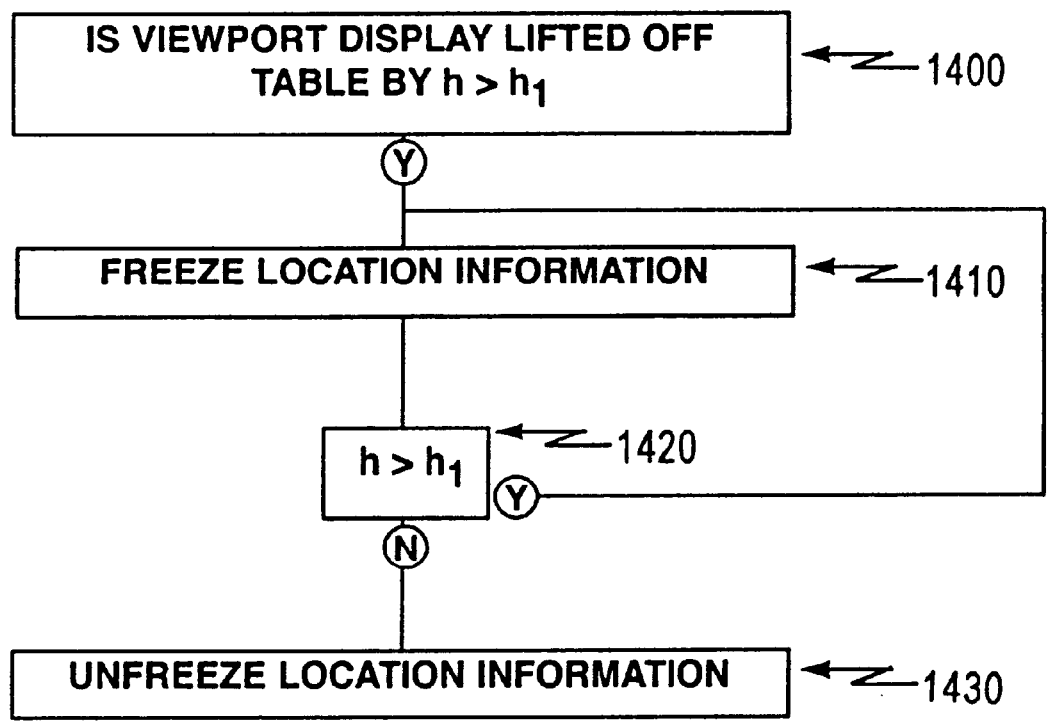
FIG. 14 is a flowchart of an exemplary process for freezing the image on the screen of the small device display when it is lifted from the display of the large screen.

FIG. 14 is a flowchart of an exemplary process for freezing the image on the handheld display when it is lifted off the table. Using the display location device, one determines whether the display has been lifted off the table by an amount H which is greater than a threshold H1 (1400). If it has been, the image displayed on the screen of the display is frozen regardless of its translation with respect to the surface of fixed display (1410). As long as the viewport display is located off the table by an amount in excess of H1 (1420-Y), the image will remain frozen. However, once it is placed back on the table, the normal location information will be received and the image will achieve the proper content for the location at which it is replaced (1430).

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A method of capturing a program running on a first computer to permit it to run on a second computer, comprising the steps of:

a. providing an element for performing a step of copying all open files from said first computer to said second computer;

b. providing an element for performing a step of copying memory space from said first computer to said second computer;

c. providing an element for performing a step of linking screens of said first computer and said second computer;

d. providing an element for performing a step of copying registers and program counters from said first computer to said second computer; and e. providing an element for performing a step of beginning executing said program on said second computer.

2. A computer program product comprising:

a. a memory medium; and b. a computer program stored on said medium, said program comprising instructions for capturing another program running on a first computer to permit said another program to run on a second computer by copying all open files from said first computer to said second computer; copying memory space from said first computer to said second computer; linking screens of said first computer and said second computer; copying registers and program counters from said first computer to said second computer; and beginning executing said another program on said second computer.

* * * * *